United States Patent [19]

Willis et al.

[11] Patent Number: 5,391,637
[45] Date of Patent: Feb. 21, 1995

[54] CAPPING OF ANIONIC POLYMERS WITH OXETANES

[75] Inventors: Carl L. Willis, Houston; Daniel E. Goodwin; Robert C. Bening, both of Katy, all of Tex.

[73] Assignee: Shell Oil Company, Houston, Tex.

[21] Appl. No.: 157,785

[22] Filed: Nov. 23, 1993

[51] Int. Cl.⁶ .................................................. C08F 8/00
[52] U.S. Cl. ................................. 525/385; 525/332.8; 525/332.9; 525/333.1; 525/333.2; 525/333.3
[58] Field of Search .......................................... 525/385

[56] References Cited

U.S. PATENT DOCUMENTS

| | | |
|---|---|---|
| Re. 27,145 | 6/1971 | Jones . |
| 4,039,593 | 8/1977 | Kamienski et al. . |
| 4,393,199 | 7/1983 | Manser ................................ 525/408 |
| 4,417,029 | 11/1983 | Milkovich . |
| 4,469,829 | 9/1984 | Konietzny . |
| 4,518,753 | 5/1985 | Richards et al. . |
| 4,753,991 | 6/1988 | Bronstert . |
| 4,970,254 | 11/1990 | Willis et al. . |
| 4,994,526 | 2/1991 | Peters . |
| 5,294,670 | 3/1994 | Hata et al. ............................ 525/154 |

FOREIGN PATENT DOCUMENTS 136503  9/1978  Germany .

Primary Examiner—Bernard Lipman
Attorney, Agent, or Firm—Keith M. Tackett

[57] ABSTRACT

Living anionic polymers of unsaturated monomers are conveniently capped with oxetane or an alkyl substituted oxetane to provide terminal primary hydroxyl groups. The hydroxyl capped polymers are useful in making coatings, sealants, binders, and block copolymers with polyesters, polyamides, and polycarbonates.

10 Claims, No Drawings

CAPPING OF ANIONIC POLYMERS WITH OXETANES

FIELD OF THE invention

This invention relates to functionalization of polymers manufactured by anionic polymerization of unsaturated monomers. More specifically, this invention relates to capping of anionic polymers to incorporate terminal functional groups.

BACKGROUND OF THE INVENTION

Anionic polymerization of unsaturated monomers, such as conjugated dienes, with lithium initiators, such as sec-butyllithium, has been described in many references. The termination of living anionic polymers to form terminal functional groups is described in U.S. Pat. Nos. 4,417,029, 4,469,829, 4,518,753, and 4,753,991. Of particular interest for the present invention are terminal hydroxyl groups.

It is an object of the present invention to provide hydrogenated butadiene polymers having terminal functional groups and low viscosity at room temperature. It is also an object of the invention to use the low viscosity polymers to make coatings and other high molecular weight polymers.

SUMMARY OF THE INVENTION

Applicants have discovered that living anionic polymers, such as living conjugated diene polymers, are conveniently capped with terminal primary hydroxyl groups by reaction with oxetane which has advantages over capping with ethylene oxide. Any remaining unsaturation in the capped anionic polymer can be partially or fully hydrogenated, and the terminal hydroxyl groups can be converted to other functional groups by conventional reactions.

DETAILED DESCRIPTION OF THE INVENTION

Anionic polymerization of unsaturated monomers is well known as described in U.S. Pat. Nos. 4,039,593 and Re. 27,145 which descriptions are incorporated herein by reference. Polymerization preferably commences with a monolithium, dilithium, or polylithium initiator which builds a living polymer backbone at each lithium site. Typical living polymer structures containing polymerized conjugated diene hydrocarbons are:

X—B—Li
X—B/A—Li
X—A—B—Li
X—B—A—Li
X—B—B/A—Li
X—B/A—B—Li
X—A—B—A—Li
Li—B—X—B—Li
Li—A—B—X—B—A—Li wherein B represents polymerized units of one or more conjugated diene hydrocarbons, A represents polymerized units of one or more vinyl aromatic compounds, B/A represents random polymerized units of the conjugated diene hydrocarbons and the vinyl aromatic monomers, and X is the residue of a lithium initiator such as sec-butyllithium. Non-conventional initiators can also be used to make the living anionic polymers such as functionalized initiators having the structure

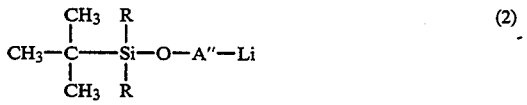

wherein each R is methyl ethyl, n-propyl, or n-butyl and A" is an alkyl-substituted or non-substituted propyl bridging group, including —CH$_2$—CH$_2$—CH$_2$—(1,3-propyl), —CH$_2$—CH(CH$_3$)—CH$_2$—(2-methyl-1,3-propyl) 1,3-propyl) and —CH$_2$—C(CH$_3$)$_2$—CH$_2$—(2,2-dimethyl-1,3-propyl), or an alkyl-substituted or non-substituted octyl bridging group such as —CH$_2$—CH$_2$—CH$_2$—CH$_2$—CH$_2$—CH$_2$—CH$_2$—CH$_2$—(1,8-octyl). The living polymers are capped by reaction with oxetane or substituted oxetanes.

The anionic polymerization of conjugated diene hydrocarbons is typically controlled with structure modifiers such as diethylether or glyme (1,2-diethoxyethane) to obtain the desired amount of 1,4-addition. As described in U.S. Pat. No. Re 27,145 which is incorporated by reference herein, the level of 1,2-addition of a butadiene polymer or copolymer can greatly affect elastomeric properties after hydrogenation.

The 1,2-addition of 1,3-butadiene polymers having terminal functional groups significantly and surprisingly influences the viscosity of the polymers as described in more detail below. A 1,2-addition of about 40% is achieved during polymerization at 50° C. with about 6% by volume of diethylether or about 1000 ppm of glyme.

Dilithium initiation with the diadduct of sec-butyllithium (s-BuLi) and m-diisopropenylbenzene also requires the presence of a non-reactive coordinating agent such as diethyl ether, glyme, or triethyl amine, otherwise monolithium initiation is achieved. Ether is typically present during anionic polymerization as discussed above, and the amount of ether typically needed to obtain a specific butadiene polymer structures has been sufficient to provide dilithium initiation.

Anionic polymerization is often terminated by addition of water to remove the lithium as lithium hydroxide (LiOH) or by addition of an alcohol (ROH) to remove the lithium as a lithium alkoxide (LiOR). For polymers of the present invention, the living polymer chains are terminated by reaction with oxetane or a substituted oxetane having one or more alkyl groups, preferably oxetane or 3,3-dimethyloxetane.

Capping with oxetanes results in primary hydroxyl groups after removal of the lithium by addition of water or an alcohol similar to capping with ethylene oxide. However, the oxetanes have substantially higher boiling points and substantially lower toxicity than ethylene oxide.

Capping of living anionic polymers with oxetanes results in release of lithium bases which interfere with hydrogenation of the polymer and preferably are removed or neutralized.

Hydrogenation of at least 90%, preferably at least 95%, of the unsaturation in conjugated diene polymers is achieved with nickel catalysts as described in U.S. Pat. Nos. Re. 27,145 and 4,970,254 and U.S. patent application Ser. No. 07/785715 now U.S. Pat. No. 5,166,277 which are incorporated by reference herein. The preferred nickel catalyst is a mixture of nickel 2-ethylhexanoate and triethylaluminum described in more detail in Example 1 below.

Butadiene or isoprene polymers capped with two or more terminal primary hydroxyl groups can be used in adhesives and coatings without solvents when the viscosity of the polymer is less than about 500 poise. These functional groups do not exhibit significant atomic attractions that would otherwise solidify the functionalized polymers. Hydrogenated butadiene polymers having a lower viscosity than 500 poise are produced by limiting the peak molecular weight to a range from 500 to 20,000 and by limiting the 1,2-addition to an amount between 30% and 70%, preferably between 40% to 60%.

The polymers of the invention have the conventional utilities for hydroxyl terminated polymers such as forming coatings, sealants, and binders. The polymers prepared using oxetanes having alkyl branches at the 3-position are expected to afford primary hydroxyls having improved thermal stability. In addition, the preferred conjugated diene polymers having about two or more terminal hydroxyl groups can be co-polymerized with conventional compounds during production of polyurethanes, polycarbonates, polyesters, and polyamides as described in U.S. Pat. No. 4,994,526 which is incorporated herein by reference. When the conjugated diene polymer is branched at the beta carbon center as is the case for a polymer prepared by capping with 3,3-dimethyloxetane, the product would be expected to have improved thermal and hydrolytic stability.

DETAILED DESCRIPTION OF PREFERRED EMBODIMENTS

Hydrogenated conjugated diene polymers having one or more terminal primary hydroxyl groups per molecule have been produced by capping living anionic polymers with oxetane or an alkyl substituted oxetane. The preferred polymers are low viscosity liquids at room temperature when the peak molecular weight of the polymer ranges between 1,000 and 10,000, as measured by gel permeation chromatography using polybutadiene standards, and when the 1,2-addition of any butadiene blocks ranges from 40% to 60%.

The peak molecular weights in the following examples were measured using gel permeation chromatography calibrated with polybutadiene standards having known peak molecular weights. The solvent for all samples was tetrahydrofuran.

The 1,2-additions vinyl contents was measured by $C^{13}$ NMR in chloroform solution.

The viscosities were measured at room temperature on a Rheometrics Dynamic Mechanical Spectrometer in dynamic oscillatory mode at a frequency of 10 radians per second.

EXAMPLE 1

A linear isoprene polymer having about one terminal hydroxyl group per molecule was prepared by capping a "living" anionically polymerized isoprene chain with oxetane (1,3-propane oxide) and protonating the intermediately formed lithium alkoxide. A s-BuLi initiated polymerization of isoprene in a diethyl ether/cyclohexane (10/90 wt/wt) mixed solvent system at about 40° C. afforded a solution (about 17% polymer solids) of "living" polymer chains. When polymerization was essentially complete, an aliquot of this solution was quenched by treatment with an excess of methanol (control sample). Analysis of the quenched sample by Gel Permeation Chromatography found a polymer having a peak molecular weight (MW) of about 1,000; $C^{13}$ Nuclear Magnetic Resonance (NMR) analysis of this sample found the 3,4isoprene addition content to be about 42% mol.

An aliquot of the "living" polymer solution (cement) was treated with an excess of oxetane (oxetane/polymer-lithium=2.4/1 (mol/mol)) to effect the capping reaction. About one minute after the addition of the capping reagent, the polymer solution lost the pale yellow color typical of a "living" isoprene cement; the mixture was stirred for an additional 1.5 hr. The sample was then treated with about ½ ml of MeOH and the product isolated. Analysis of the capped and protonated product by GPC and NMR found a linear isoprene polymer having 99% of the chains capped on one end by a primary hydroxyl moiety derived from reaction with oxetane.

Analogous aliquots of the same "living" polymer cement were treated with varying amounts of oxetane affording the following results:

| Oxetane/Polymer-Li (mol/mol) | Capping Efficiency (mol % hydroxyl endcap) |
|---|---|
| 1.2 | 93 |
| 2.4 | 99 |
| 4.7 | 96 |
| 9.5 | 88 |

These results show that a "living" isoprene polymer treated with oxetane will react to afford a polymer intermediate which when worked up under conditions that protonate the lithium alkoxide affords a polymer having a primary hydroxyl end group.

EXAMPLE 2

Using a procedure similar to that described in Example 1, a linear polyisoprene polymer having about one terminal, primary, hydroxyl (with dimethyl branching at the beta-carbon center) per molecule was prepared by capping a "living" anionically polymerized isoprene chain with 3,3-dimethyloxetane and protonating the intermediately formed lithium alkoxide. A s-BuLi initiated polymerization of isoprene in cyclohexane at about 45° C. afforded a solution (about 7% polymer solids) of "living" polymer chains. When polymerization was essentially complete, an aliquot of this solution was quenched by treatment with an excess of methanol (control sample). Analysis of the quenched sample by GPC and NMR found an isoprene polymer having MW of about 1,000 and a 3,4-isoprene addition content of about 7 mol %. An aliquot of the "living" polymer solution (cement) was treated with an excess of 3,3-dimethyloxetane (DMO) (DMO/polymer-lithium=2.0/1 (mol/mol)), to effect the capping reaction. After standing overnight, the polymer solution lost the pale yellow color typical of a "living" isoprene cement. The sample was then treated with about 2 ml of MeOH and the product isolated. Analysis of the capped and protonated product by GPC and NMR found a linear isoprene polymer having 74% of the chains capped on one end by a primary hydroxyl moiety (with dimethyl branching at the beta carbon center) derived from reaction with DMO.

Analogous aliquots of the same "living" polymer cement were treated with varying amounts of oxetane affording the following results:

| DMO/Polymer-Li (mol/mol) | Capping Efficiency (mol % hydroxyl endcap) |
|---|---|
| 1.0 | 67 |
| 2.0 | 74 |
| 3.0 | 69 |

These results show that a "living" isoprene polymer treated with DMO will react to afford a polymer intermediate which when worked up under conditions that protonate the lithium alkoxide affords a polymer having a primary hydroxyl end group with dimethyl branching at the beta carbon center.

EXAMPLE 3

A functionalized lithium initiator, designated PFI3, was prepared in dry cyclohexane by reaction of 3-chloro-1-propanol with t-butyldimethylsilyl chloride (TBDMS-Cl) in the presence of imidazole, followed by reaction with lithium metal. The concentration of active lithium alkyl was determined by titration with diphenylacetic acid, as described by W. G. Korfron and L. M. Baclawski (J. Org. Chem, 41(10), 1879 (1976).

A polymer was prepared using this functionalized lithium initiator in a 2 liter glass autoclave (Büchi) at 10% solids, according to the following procedure: Butadiene (100 g.) was added to a 90/10 mixture of cyclohexane/diethyl ether (900 g. total). The calculated quantity of initiator solution (13.8% wt.) was added to the monomer solution at 20° C.-23° C. and then the temperature was increased to 40° C. over about a 10 minute period, by setting the temperature of the circulating bath to 43.5° C.; temperature control is provided by circulating water from a temperature-controlled circulating bath, through a concentric jacket. The polymerization was sufficiently exothermic to increase the reactor temperature to about 56° C. The polymerization was allowed to proceed for about 45 minutes and then 2 equivalents of oxetane was added to generate the terminal hydroxyl group. After about 30 minutes, the reaction was terminated with about 1.1 equivalents of methanol. Samples were analyzed by $^{13}$C NMR and GPC (calibrated with commercial poly(butadiene) standards). The polymer exhibited a narrow molecular weight distribution, with a peak molecular weight of 4,300, in good agreement with the targeted value of 4,000. The capping efficiency, as determined by NMR, was 82%.

We claim:

1. A polymer produced by a process comprising the steps of:
   anionically polymerizing a living polymer of an unsaturated monomer; and
   reacting the living polymer with oxetane or an alkyl substituted oxetane.

2. The polymer of claim 1, wherein the living polymer is reacted with 3,3-dimethyl oxetane.

3. The polymer of claim 1, wherein the living polymer has two terminal sites per molecule that are reactive with the oxetane or the substituted oxetane.

4. The polymer of claim 1, wherein the living polymer has a peak molecular weight between 1000 and 10000.

5. The polymer of claim 4, wherein the unsaturated monomer is butadiene and the polymerized butadiene has between 40 % and 60 % 1,2-addition.

6. The polymer of claim 5, further comprising the step of hydrogenating the polymerized butadiene.

7. The polymer of claim 1, wherein the polymerization of the living polymer is initiated with a functionalized initiator having the structure

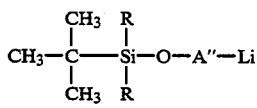

wherein each R is methyl, ethyl, n-propyl, or n-butyl and A" is an alkyl-substituted or non-substituted propyl bridging group or an alkyl-substituted or non-substituted octyl bridging group.

8. The polymer of claim 7, wherein each R is methyl and A" is non-substituted propyl.

9. The polymer of claim 1, wherein the polymerization of the living polymer is initiated with sec-butyllithium.

10. The polymer of claim 1, further comprising the step of reacting the capped living polymer with methanol.

* * * * *